United States Patent Office 3,022,180
Patented Feb. 20, 1962

3,022,180
CERAMIC MATERIAL AND METHOD OF MAKING THE SAME
William J. Morrissey, Pittsfield, Mass., and James W. Roy, Caldwell, N.J., assignors to General Electric Company, a corporation of New York
No Drawing. Filed Sept. 23, 1959, Ser. No. 841,680
6 Claims. (Cl. 106—39)

The present invention relates to the preparation of ceramic products, and more particularly to an improved process for making crystalline ceramic products of high mechanical strength and good electrical properties.

Ceramic materials such as porcelain, alumina, and the like have been found advantageous for use as electrical insulating material where high strength coupled with good electrical insulating properties are desirable. A difficulty in the use of the known materials of this type, however, has been the relatively complicated and expensive processes necessary to fabricate such materials in the desired product configuration. Such processes normally entail the use of elevated firing temperatures and extremely high molding pressures to properly compact and harden the material and mold it in the desired shape. While glass-forming mixtures have been readily formed into insulating products of desired shape by simple casting techniques, such a procedure is not effective or practical with porcelain or other known ceramic type compositions. For one thing, the ceramic compositions would require extremely high temperatures, e.g., of the order of 1800° C., to make them sufficiently fluid for casting purposes. A further difficulty is that such compositions, even if made sufficiently molten for casting, would tend to crystallize immediately upon being poured into a mold, giving rise to a process of devitrification which is difficult to control. The usual effect of such rapid crystallization or devitrification is the formation of crystals which are relatively large and non-uniform in size, and consequently the mechanical and electrical qualities of the final ceramic product are much less favorable than those obtained in products composed of small, uniformly sized, compactly arranged crystals.

It is an object of the present invention to provide hard, dense, ceramic products having high mechanical strength and good electrical properties by a simplified process which avoids the above disadvantages of the known methods for making ceramic products.

It is another object of the invention to provide a method of making ceramic products of the above type which is simple and economical, and is readily carried out to produce ceramic products of any desired configuration.

It is still another object of the invention to provide a composition of material which is adapted to produce ceramic products by simple casting techniques.

The above objects, and others which will be apparent from the following description and appended claims, are attained in accordance with the invention by forming a melt of a composition comprising MgO, $SiO_2$, $Al_2O_3$, and a fluxing agent, in proper proportions as hereinafter more fully described, cooling the melt to arrest the formation of crystals therein and forming thereby an amorphous, vitreous material, and thereafter heating the thus-formed vitreous material for converting it to a microcrystalline magnesium silicate ceramic body composed predominantly of a homogeneous mass of minute, randomly oriented crystals.

In accordance with the present invention, it is unnecessary to incorporate a nucleating agent in the molten composition to induce the nucleation or growth of crystals during the subsequent thermal treatment of the vitreous material. The composition ingredients and proportions thereof are such that a metastable glass material is initially formed, which requires only a small amount of energy, supplied by the thermal treatment, to be converted from an amorphous, vitreous phase to a crystalline ceramic phase by a process of auto-crystallization.

The invention is further significant in that the composition employed does not, after being cast, tend to rapidly crystallize or devitrify under ordinary cooling procedures as is characteristic of known types of ceramic-forming compositions, and elaborate procedures to avoid uncontrolled devitrification are therefore unnecessary.

The composition of the ceramic material produced in accordance with the invention is as follows, the approximate ranges of constituents being in percent by weight:

|  | Percent |
|---|---|
| MgO | 20–50 |
| $SiO_2$ | 20–55 |
| $Al_2O_3$ | 5–20 |
| Fluxing agent | 5–15 |

A particularly preferred range of content of the above ingredients is the following:

|  | Percent |
|---|---|
| MgO | 22–30 |
| $SiO_2$ | 40–50 |
| $Al_2O_3$ | 10–18 |
| Fluxing agent | 8–13 |

Fluxing agents which may be suitably used in the above compositions include, but are not limited to, NaO, $B_2O_3$, $K_2SiF_6$, and $K_2O$, and combinations thereof.

The following are examples of compositions which have produced satisfactory results in accordance with the invention, it being understood that the following specific compositions are given for illustration only and are not to be interpreted as limiting the scope of the invention:

*Example I*

| Batch Material | Batch, Percent | Product Material | Product, Percent |
|---|---|---|---|
| Magnesium Oxide | 35.2 | MgO | 45.0 |
| Glass Sand (Flint) | 17.2 | $SiO_2$ | 22.0 |
| Hydrated Alumina | 12.0 | $Al_2O_3$ | 10.0 |
| Potassium Nitrate | 21.8 | $K_2O$ | 13.0 |
| Boric Acid | 13.8 | $B_2O_3$ | 10.0 |

The above composition which produced a hard, dense, white ceramic body, had a melting temperature of about 1490° C., an initial crystallization temperature of 850° C.–900° C., and an optimal crystal growth temperature of 1050° C.

*Example II*

| Batch Material | Batch, Percent | Product Material | Product, Percent |
|---|---|---|---|
| Magnesium Oxide | 36.3 | MgO | 46.0 |
| Glass Sand | 23.7 | $SiO_2$ | 30.0 |
| Hydrated Alumina | 12.1 | $Al_2O_3$ | 10.0 |
| Boric Acid | 5.6 | $B_2O_3$ | 4.0 |
| Potassium Silica-fluoride | 22.3 | $K_2SiF_6$ | 10.0 |

The melting temperature of the above composition was about 1430° C., the initial crystallization temperature was about 850° C., and the optimum crystallization temperature was about 1050° C. The product was a white, hard, and very dense crystalline ceramic.

Example III

| Batch Material | Batch, Percent | Product Material | Product, Percent |
|---|---|---|---|
| Magnesium Oxide | 26.0 | MgO | 29.7 |
| Glass Sand | 26.0 | SiO$_2$ | 29.7 |
| Hydrated Alumina | 23.9 | Al$_2$O$_3$ | 17.8 |
| Boric Acid | 9.3 | B$_2$O$_3$ | 6.0 |
| Potassium Silica-fluoride | 14.8 | K$_2$SiF$_6$ | 16.8 |

The melting temperature of the above composition was 1430° C., the initial crystallization temperature was about 900° C., and the optimum crystal growth temperature was about 1050° C.

Example VI

| Batch Material | Batch, Percent | Product Material | Product, Percent |
|---|---|---|---|
| Magnesium Oxide | 19.2 | MgO | 22.5 |
| Glass Sand | 42.3 | SiO$_2$ | 49.4 |
| Hydrated Alumina | 23.1 | Al$_2$O$_3$ | 17.6 |
| Soda Ash | 15.4 | NaO | 10.5 |

The above composition had a melting temperature of 1440° C., an initial crystallization temperature at 860° C. and an optimum growth temperature of 1050° C.

Each of the above compositions when processed in accordance with the invention yielded dense micro-crystalline bodies of synthetic forsterite structure as determined by X-ray diffraction and microscopic observation. The structure thus observed appeared as euhedral and subhedral crystals which are equant, sometimes rounded, with distinct cleavages and irregular partings.

Example V

| Batch Material | Batch, Percent | Product Material | Product, Percent |
|---|---|---|---|
| Magnesium Oxide | 36.3 | MgO | 40.7 |
| Glass Sand | 32.7 | SiO$_2$ | 36.8 |
| Boric Acid | 8.9 | B$_2$O$_3$ | 5.6 |
| Potassium Carbonate | 22.1 | K$_2$O | 16.9 |

The above composition formed a very pale brown ceramic body. The composition had a melting temperature of 1550° C., an initial crystallization temperature of about 900° C., and an optimum crystal growth temperature of about 1050° C.

Example VI

| Batch Material | Batch, Percent | Product Material | Product, Percent |
|---|---|---|---|
| Magnesium Oxide | 39.0 | MgO | 42.3 |
| Glass Sand | 19.5 | SiO$_2$ | 21.2 |
| Boric Acid | 11.1 | B$_2$O$_3$ | 6.7 |
| Hydrated Alumina | 8.4 | Al$_2$O$_3$ | 6.0 |
| Potassium Silica-fluoride | 22.0 | K$_2$SiF$_6$ | 23.8 |

The above composition yielded a dense, buff-colored ceramic material, the composition having a melting temperature of 1495° C., an initial crystallization temperature of about 900° C. and an optimum crystallization growth temperature of about 1050° C.

Example VII

| Batch Material | Batch, Percent | Product Material | Product, Percent |
|---|---|---|---|
| Magnesium Oxide | 27.3 | MgO | 29.1 |
| Glass Sand | 33.9 | SiO$_2$ | 36.1 |
| Boric Acid | 14.0 | B$_2$O$_3$ | 8.4 |
| Potassium Silica-fluoride | 24.8 | K$_2$SiF$_6$ | 26.4 |

The above composition formed a dense, white ceramic body, the composition having a melting temperature of about 1490° C., and crystallization temperatures similar to those of the compositions above described. The product of this example, however, was distinguished from the previously described compositions in that X-ray diffraction analysis showed that the product was a member of the enstatite group of crystal structures. Enstatite, in common with forsterite, is constituted by magnesium silicate crystals, enstatite having the formula of $$MgO \cdot SiO_2$$

while forsterite has the formula $2MgO \cdot SiO_2$. Enstatite crystals are short square prisms or tablets.

The magnesium, silicon, and aluminum oxides of the above compositions can be introduced into the batch either as pure oxides or as minerals containing one or more of the oxides. Among these minerals are magnesite (MgCO$_3$) which would yield the magnesium oxide, kyanite (Al$_2$SiO$_5$) which would yield both aluminum oxide and silicon oxide, and spinel (MgAl$_2$O$_4$) which would yield magnesium oxide and aluminum oxide. Many other types of minerals could be used to provide the necessary oxide components.

Tests made on a typical product obtained by the composition and process of the invention showed that its mechanical strength, e.g., elasticity, flexural strength, compressive strength, impact resistance, and electrical properties, such as dielectric constant, loss factor, capacitance, and dielectric strength were in general at least equivalent and in some cases superior to that of high grade electrical porcelain.

The following is a typical process for making the ceramic material of the invention and is applicable in particular to the composition of Example IV, it being understood that variations may be made in the specific procedure and values set forth herein without departing from the inventive concept.

The raw materials of the batch composition, finely divided by a ball mill or the like, are mixed in the proper proportions and melted in an electric furnace at a temperature in the vicinity of 1300° C. A centrifugal steel mold is prepared for producing a bushing configuration of the melt, and the necessary metal hardware is placed in the mold for embedding in the final product. With the mold preheated to a temperature of about 200–300° C., the molten batch composition is poured therein to a predetermined level. The casting temperature of the molten material at this stage is about 1440° C. The mold containing the molten material therein is spun about its axis so that the molten contents take on the configuration of the mold. The material is allowed to cool in the mold to below the annealing temperature, e.g., about 700° C., that is to say, to a temperature at which the molten material becomes sufficiently solidified to prevent its slumping in the mold and to ensure sufficient rigidity to provide a self-supporting cast product.

Of particular significance in accordance with the invention is the arresting of crystallization of the molten material by such cooling to a temperature at which the amorphous material becomes extremely viscous or almost solidified. This prevents the formation of large crystals of non-uniform size which would otherwise occur to produce what is known as devitrification, a crystallizing action which is not readily controlled and which yields crystals of a type and arrangement which are not desired for the purposes of the present invention.

With the cast material thus cooled, the melted amorphous article is removed from the mold, placed in an annealing furnace at 700° C., and retained therein for a sufficient period of time for the entire structure to attain the furnace temperature. At this stage the molded product is an amorphous, vitreous material having no crystals therein. The article is then heated up to about 860° C. and held at this temperature for the purpose of initiating the autocrystallization process. The article is maintained at this temperature for a sufficient period, e.g., 15 minutes to 2½ hours, with ½ to 1 hour being optimum, in order to produce a support skeleton of crystals in the product to ensure that it is self-supporting before the temperature is raised to the optimum crystallization level. As soon as this result is obtained, the temperature is raised to about 1050° C. and held for about 1 to 8 hours, with 4 hours being the optimum time. These conditions are optimum for inducing the growth of magnesium silicate crystals of the desired form and orientation. Thereafter the product is gradually cooled to room temperature.

If desired, during the initial cooling step, the product may be cooled to room temperature for the purpose of inspection to determine whether the amorphous glassy phase of the molded article has any defects. After this procedure, the article may be subjected to the heating temperature described above to initiate and complete the auto-crystallization process.

As will be understood, the particular temperatures and other values set forth may be different from those stated depending on the particular composition employed, since different compositions may be characterized by different annealing, melting, and initial and optimum crystallization temperatures.

As a result of the described process there is obtained a hard, dense, crystalline ceramic-like body of excellent electrical and mechanical properties wherein the metal hardware and ceramic material are joined in a strong, fluid-tight ceramic-to-metal seal.

The invention thus provides a novel ceramic product and method of making the same which affords numerous advantages over the prior known ceramic materials and processes. For example, as compared to porcelain, more precise dimensional tolerances are obtainable in the final product due to less shrinkage during the processing, the material is easier to work, shorter and more efficient manufacturing cycles are made possible, better hermetic seals with metal parts are achieved, the ceramic product can be reused even if broken, and in general lower cost components are employed.

Although the described material is particularly adapted for simple casting procedures, it may, after being poured in molten form into a mold, be subjected to pressing operations to achieve more sharply defined configurations. It is not however, necessary to employ high pressures to achieve coherence or high density of the mass, as in the case of porcelain and other ceramics.

The described material has also been found useful as a bonding agent, as for example for such materials as alumina, magnesia, silicon carbide, mica isomorphs, and the like, and affords thereby improved electrical properties for such bodies as compared to glass-bonded or porcelain-bonded materials.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. A hard, dense, mechanically strong, electrically insulating ceramic material formed of a substantially homogeneous micro-crystalline mass composed essentially of randomly oriented synthetic magnesium silicate crystals, said material having the following approximate composition in percent by weight:

| | Percent |
|---|---|
| MgO | 20–50 |
| $SiO_2$ | 20–55 |
| $Al_2O_3$ | 5–20 |
| Fluxing agent | 5–15 |

2. A hard, dense, mechanically strong, electrically insulating ceramic material formed of a substantially homogeneous micro-crystalline mass composed essentially of randomly oriented synthetic magnesium silicate crystals, said material having the following approximate composition in percent by weight:

| | Percent |
|---|---|
| MgO | 22–30 |
| $SiO_2$ | 40–50 |
| $Al_2O_3$ | 10–18 |
| Fluxing agent | 8–13 |

3. A hard, dense, mechanically strong, electrically insulating ceramic material formed of a substantially homogeneous micro-crystalline mass composed essentially of randomly oriented synthetic magnesium silicate crystals, said material having the following approximate composition in percent by weight:

| | Percent |
|---|---|
| MgO | 20–50 |
| $SiO_2$ | 20–55 |
| $Al_2O_3$ | 5–20 |
| Fluxing agent | 5–15 | said fluxing agent being selected from the group consisting of NaO, $B_2O_3$, $K_2SiF_6$, $K_2O$, and combinations thereof.

4. The method of making a hard, dense, mechanically strong, electrically insulating ceramic material which comprises forming a melt of a material having the following approximate composition in percent by weight:

| | Percent |
|---|---|
| MgO | 20–50 |
| $SiO_2$ | 20–55 |
| $Al_2O_3$ | 5–20 |
| Fluxing agent | 5–15 | cooling said melt to about the annealing temperature thereof to arrest the formation of crystals therein and forming thereby an amorphous, vitreous material, heating the thus formed vitreous material to a temperature of about 850–900° C. for a period sufficient to initiate crystallization of said material, and thereafter heating the material to about 1050° C. for converting the same to a micro-crystalline ceramic body composed essentially of randomly oriented synthetic magnesium silicate crystals.

5. The method of making a hard, dense, mechanically strong, electrically insulating ceramic material which comprises forming a melt of a material having the following approximate composition in percent by weight:

| | Percent |
|---|---|
| MgO | 20–50 |
| $SiO_2$ | 20–55 |
| $Al_2O_3$ | 5–20 |
| Fluxing agent | 5–15 | casting said melt into a mold, cooling the melt in said mold to the annealing temperature of the melt to arrest the formation of crystals therein and forming thereby an amorphous, vitreous product having a configuration imparted thereto by the mold, removing said product from the mold, heating the thus formed vitreous product to a temperature of about 850–900° C. for a period sufficient to initiate crystallization of said product, and thereafter heating the product to about 1050° C. for converting the same to a micro-crystalline ceramic body composed essentially of randomly oriented synthetic magnesium silicate crystals.

6. The method of making a hard, dense, mechanically strong, electrically insulating ceramic material which comprises forming a melt of a material having the following approximate composition in percent by weight:

| | Percent |
|---|---|
| MgO | 20–50 |
| $SiO_2$ | 20–55 |
| $Al_2O_3$ | 5–20 |
| Fluxing agent | 5–15 | casting said melt into a mold having metal parts arranged therein for embedding in the cast product, cooling the melt in said mold to the annealing temperature of the melt to arrest the formation of crystals therein and forming thereby an amorphous, vitreous product having a configuration imparted thereto by the mold and having embedded therein said metal parts, removing said product from the mold, heating the thus formed vitreous product to a temperature of about 850–900° C. for a period sufficient to initiate crystallization of said product, and thereafter heating the product to about 1050° C. for converting the same to a micro-crystalline ceramic body composed essentially of randomly oriented synthetic magnesium silicate crystals.

References Cited in the file of this patent
UNITED STATES PATENTS

| | | |
|---|---|---|
| 2,691,855 | Armistead | Oct. 19, 1954 |
| 2,912,340 | Pincus | Nov. 10, 1959 |
| 2,920,971 | Stookey | Jan. 12, 1960 |
| 2,960,801 | King et al. | Nov. 22, 1960 |
| 2,960,802 | Voss | Nov. 22, 1960 |

OTHER REFERENCES

Roy et al.: "The System Lithium Metasilicate-Spodumene-Silica," J. Amer. Ceramic Soc., vol. 71, pp. 2086–2095, June 1949.

Phase Diagrams for Ceramicists, pub. 1956 by Amer. Ceramic Soc. Inc., Columbus, Ohio.